United States Patent Office 3,498,825
Patented Mar. 3, 1970

3,498,825
METHOD OF RENDERING GLASS SURFACES ABRASION-RESISTANT AND GLASS ARTICLES PRODUCED THEREBY
Bradley E. Wiens, Toledo, Ohio, assignor to Owens-Illinois, Inc., a corporation of Ohio
No Drawing. Continuation-in-part of abandoned application Ser. No. 423,304, Jan. 4, 1965. This application Feb. 24, 1966, Ser. No. 529,645
Int. Cl. C03c 17/28, 17/22
U.S. Cl. 117—72     5 Claims

ABSTRACT OF THE DISCLOSURE

A method, and the article of manufacture produced thereby, for increasing the abrasion-resistant properties of a glass surface comprising depositing tin oxide on the hot glass surface by applying in the presence of water a tin compound selected from the group consisting of $$SnX_4 \text{ and } R_2Sn(OOCR')_2$$

wherein X is a halogen and R and R' are alkyls, while the temperature of said surface is at least as high as the pyrolyzing temperature of said tin compound, cooling said coated surface to a temperature of below 350° F., and applying onto said tin treated glass surface a member selected from the group consisting of: (1) a dimethylpolysiloxane-polyoxalkylene ether copolymer and a dimethylpolysiloxane-polyoxyalkylene copolymer; (2) a polyoxyethylene stearate; and (3) an alkylphenoxypoly(ethyleneoxy) ethanol.

---

This application is a continuation-in-part of application Ser. No. 423,304, filed Jan. 4, 1965, now abandoned.

The present invention relates to the treatment of glass surfaces which are subjected to abrasive contact with each other in the course of handling, filling, and packaging operations and, more particularly, to a method of treating such glass surfaces to improve their resistance to abrasion. This invention further relates to improved abrasion-resistant glass articles produced by the aforesaid method.

Glass derives its strength from an unblemished surface, and any scratches or flaws which are present on its surface considerably decrease its strength, down to as little as one fourth of its original value. While glass articles such as jars, bottles, tumblers, and the like, have their maximum strength as soon as they are formed, this strength rapidly diminishes as the articles come into contact with each other and with other surfaces, as occurs during the handling, packaging, and shipping of the glass ware. This problem is particularly acute in the food-and beverage-processing field wherein the glass containers are subjected to various processing cycles, whereby the bottles are successively filled, closed, and packaged for delivery. Many times the bottles are also subjected to washing, sterilizing, or vacuum treatments, depending upon the particular products with which they are filled.

During each of these operations, the bottles continuously come into contact with each other as they move from station to station and as they are handled by the various apparatus. Breakage of bottles during these operations, particularly after the bottles have been filled, presents additional problems to the processors and adds to the total cost of the operations. To minimize the resulting scratching and abrading of the glass surfaces during the aforesaid operations, numerous attempts have been made in the past to coat the exterior glass surfaces with lubricant compositions. While coating compositions have been used commercially and impart good scratch-resistant properties to glass containers, the properties imparted by some of these compositions are considerably reduced, if not lost altogether, when the treated glass surface is wetted either by water or steam, during the processing cycle. Glass containers for beer, for example, are subjected to a caustic wash prior to being filled, and the glass surfaces, being constantly jostled together as they successively move along the conveyors to the filling, capping, and packaging stations, become scratched and weakened due to the loss of the scratch-resistant properties originally imparted by the coating. Since the product is packaged under pressure, as are carbonated beverages, for example, it is extremely desirable that the surfaces of the containers have as few scratches or abrasions as possible when they ultimately reach the consumer.

It will be appreciated that if the bottles are coated with a composition having good wet and dry scratch-resistant or abrasion-resistant properties, more bottles can be handled by the filling and packaging apparatus in the same amount of time merely by spacing the bottles closer together and increasing the speed of the conveyors. Even though the bottles will be subjected to more contacts with adjoining bottles, the coating will afford sufficient protection so as not to weaken the glass bottles.

Accordingly, it is an object of this invention to provide a method for forming an abrasion-resistant coating on glass surfaces while avoiding the shortcomings of the methods and compositions known and used in the past in attempting to form such abrasion-resistant coatings.

Another object of this invention is to provide a thin, substantially transparent coating on a glass surface, which coating is highly resistant to abrasion, while simultaneously substantially maintaining the strength characteristics of the glass.

Still another object of this invention is to provide a method for coating a glass surface, such as the exterior of a glass container, so as to impart thereto improved dry and wet scratch-resisting properties, thus permitting the container to undergo normal handling, processing, and shipping, with the consequent rubbing of the glass surface with other surfaces, without materially decreasing the strength of the container.

A further object of this invention is to provide an article of manufacture having a glass surface and, on said surface having a tightly adhering, thin, substantially colorless and transparent coating which coating imparts superior wet and dry scratch-resisting and abrasion-resisting properties to the glass surface.

A further object of this invention is to provide glassware having a thin substantially colorless and transparent coating on its surface which coating is insoluble in water or caustic solutions, is free from taste and odor, and is nontoxic, so as to permit the ware to be safely used for food and beverages.

In attaining the objects of this invention, one feature resides in applying to a glass surface, a tin-containing compound which is pyrolyzable, i.e., chemically decomposed by the action of heat, to form oxides of tin on the glass surface while the surface is at a temperature above the pyrolyzing temperature of the compound, cooling the treated glass, such as in an annealing lehr, and applying to the cooled surface, while it is at a temperature within the range of about 150–350° F., a coating of one of a particular group of compounds, which coating, when dried, tenaciously bonds to the tin oxide layer on the glass.

Still another feature resides in first treating a glass surface with a tin containing compound of the formula $R_2Sn(-OOCR')_2$ wherein R and R' are alkyls, which compounds are pyrolyzable to oxides of tin when sprayed onto the glass while the surface is at a temperature above the pyrolyzing temperature of the compound, to form a colorless, transparent, i.e., invisible, coating firmly adhering to the glass surface and then applying to the coated surface a second composition to be described infra, which, upon drying, tenaciously adheres to the coated surface and results in an over-all transparent colorless coating which is harder and more scratch resistant than either coating, per se.

The above and other objects, features, and advantages of the present invention will become apparent to those skilled in the art upon a reading of the following description of the invention.

In carrying out the invention, the glass surface of an article of manufacture, such as a bottle, jar, tumbler, sheet glass, and the like, is first treated soon after the article leaves the glas-forming machine and as it is being conveyed to the annealing lehr. A tin-containing compound is applied to the exterior of the glass surface while the glass surface is at a temperature above the pyrolyzing temperature of the compound. The temperature of the shaped ware, as it leaves the glass-forming machine, is such that it is above the pyrolyzing temperature of the compounds. The range of temperature necessary to pyrolyze the tin-containing compounds is between about 700° to 1300° F., depending upon the particular compound used, with the preferred range being about 900° to 1200° F.

The tin-containing compound which is employed for the purpose of this invention is one which upon contact with the heated glass surface will react to form thereon a substantially colorless, transparent layer or coating of tin oxide, primarily $SnO_2$. The layer or coating tightly adheres to the surface of the glass and can have an average thickness of up to about 1 micron, but is preferably less than 1 micron.

Among the tin-containing precursor compounds capable of pyrolyzing to the oxides of tin and suitable for purposes of this invention are the stannic salts, including stannic halides, such as stannic chloride, stannic bromide and stannic iodide, and the dialkyl tin carboxylates, including those having the formula $R_2Sn(OOCR')_2$ wherein R and R' are alkyl groups. Tin-containing precursor compounds refer to tin compounds that are capable of pyrolysis to the oxides of tin under the influence of water. R may preferably contain from 1 to about 8 carbon atoms, while R' preferably has from 1 to about 18 carbon atoms. Included among the many compounds coming within the scope of the foregoing are dibutyl tin diacetate, diproyl tin diacetate, dioctyl tin diacetate, dibutyl tin disterate, dibutyl tin dipalmitate, dibutyl tin laurate, dibutyl tin maleate and the like. Of course, the stannic halide precursor compounds in contact with water as in illustrative examples hreinfter, hydrolyze to form oxygen containing compounds decomposable or pyrolyzable to tin oxides as will be understood.

As the glass articles, now coated with the thin, transparent tin oxide layer, enter the annealing lehr and are progressively cooled over a period of time to about 400° F. and lower, they are sprayed with an organic coating composition, which, upon drying, forms a hard, transparent, colorless, invisible coating on the glass surfaces, rendering the surfaces highly resistant to scratches and abrasions when the surfaces are wet or dry, even after being subjected to a caustic wash. As used herein, the term drying generally contemplates a cooling of the organic coated glass article to room temperature; the loss of sensible heat by this article being used to dry or vaporize any volatiles remaining on the glass surface subsequent to the organic coating application.

Among the compositions which have been found suitable for application at the cold end treatment of the glass articles are the silicones previously sold under the trademarks G.E. SF-1034 and G.E. XF-1066 (the latter presently being sold under the trademark G.E. SF-1066) and which are condensation copolymers of monomers having the formulas:

SF-1034
H—[—O—Si(CH₃)₂—]ₙ—OH
HO—(CH₂—CH₂—O—)ₙ—H
XF-1066
H—[—O—Si(CH₃)₂—]ₙ—OH
R—O—(CH₂—CH₂—O—)ₙ—H wherein R is an alkyl, preferably methyl. SF-1034 is a dimethylpolysiloxane and polyoxyalkylene copolymer, while XF-1066 is a copolymer of a dimethylpolysiloxane and a polyoxyalkylene ether. The silicones have the following physical properties:

| Properties | G.E. SF-1034 | G.E. XF-1066 |
|---|---|---|
| Gardner Color | | 4–8 |
| Viscosity at 25° C, centistokes | 1,050 | 1200–1500 |
| Viscosity at 100° F, centistokes | | 700–800 |
| Viscosity at 210° F, centistokes | | 120–135 |
| Specific gravity, 20°/4° C | 1.02 | |
| Specific gravity, 20°/20° C | | 1.04 |
| Refractive Index, 20° C | 1.4454 | 1.447 |
| Flash point (open cup), °F | 500 | 415 |
| Pour point, °F | −15 | −13 |
| OH number, mg. KOH/gm | | 4–6 |
| Acid number, mg. KOH/gm | | 0.3–0.5 |
| pH | | 7.5 |
| Surface tension 25° C., dynes/cm | 26.8 | |

Another composition which has been found suitable for an overcoat applied to a glass surface having a tin oxide coating thereon is polyoxyethylene stearate containing from 8 to 100 moles of ethylene per mole of stearic acid.

These have the formulation:

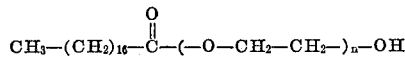

wherein $n$ is an integer of 8 to 100.

Also suitable are the alkylphenoxypoly(ethyleneoxy) ethanols sold under the trademark Igepal and having the formula

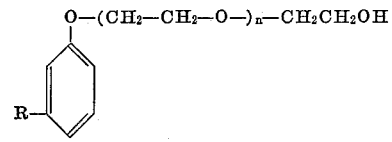

where R is an alkyl and preferably where R is octyl and nonyl or higher alkyl, and $n$ is an integer of from 1 to 100 and greater. In a specific embodiment of the invention $n$ is preferably 8 to 9. Included are the particular compounds disclosed in U.S. Patent 2,982,672 granted May 2, 1961, and assigned to the assignee of the present application. Such alkylphenoxypoly(ethyleneoxy) ethanol compounds are incorporated herein by reference.

The following examples are merely illustrative of the present invention and should not be considered limiting its scope in any way.

EXAMPLE I

A solution of $SnCl_4$ was prepared by dissolving 1437 grams of $SnCl_4 \cdot 5H_2O$ in 500 ml. of water. The solution was sprayed, using compressed dry air, onto the exterior surfaces of 12 oz., wide mouth, one-way glass beer bottles as they were continuously being conveyed from the bottle-forming machine to the annealing lehr. The rate of spraying was about 1 g.p.h. (gallon per hour). The temperature of the glass surfaces was 1000–1200° F., and the stannic chloride pyrolyzed almost immediately. A clear, transparent coating formed on the surface of the bottles. While the coating was hard, it could be scratched by firmly rubbing two bottles against each other.

EXAMPLE II

A number of glass bottles were first treated by the process as described in Example I and the coated bottles were then further treated by applying thereto, while at a temperature of about 200° F., a composition having 0.5% by weight of silicone (G.E. XF-1066) in water, using a DeVilbiss EGA hand spray gun. Upon drying, a thin, hard, colorless, transparent coating was formed on the bottles. Rubbing two coated bottles together by hand produced no scratches. While a 0.5% solids composition is preferred, in applying the second coat, a 0.1% to 1% solids solution can also be used. However, the more solids appearing in the composition, the more difficult it is to obtain the desired coating and the more care must be exercised during its application.

EXAMPLE III

A number of uncoated bottles were treated solely with the silicone, G.E. XF-1066, in accordance with the method described in Example II. When rubbed together by hand, scratches readily developed on the glass surfaces.

EXAMPLE IV

A number of glass bottles were coated in the manner disclosed in Example II except that the silicone G.E. SF-1034 was used in lieu of G.E. XF-1066. No scratches occurred when rubbed hard together.

EXAMPLE V

A number of uncoated bottles were treated solely with the silicone G.E. SF-1034 in the manner disclosed in Example III. When rubbed together by hand, scratches occurred on the surfaces.

EXAMPLE VI

A number of glass bottles were first treated by the process as described in Example I and the coated bottles were then further treated by applying thereto, while at a temperature of 200° F., an aqueous composition containing 0.5% by weight octylphenoxypoly(ethyleneoxy) ethanol (Igepal CA-630, wherein $n$ is 8 to 9) using a DeVilbiss EGA hand spray gun. Upon drying, a thin hard, colorless, transparent coating was formed on the bottle surfaces. Again, when two coated bottles were rubbed together by hand, no scratches were produced thereon. Said aqueous composition may be applied in concentrations of less than 0.1% to 1% or more although no additional benefits are obtained when as much as 1% is used.

EXAMPLE VII

A number of uncoated bottles were coated solely with the Igepal CA-630 in the manner disclosed in Example VI. When rubbed together by hand, scratches occurred on the glass surfaces.

Bottles treated in accordance with the foregoing examples were tested with a scratch test machine to evaluate the effectiveness of the respective coatings. The machine is designed to abrade the surface of one glass bottle against the surface of a similar bottle, and is fully described and illustrated in U.S. Patent No. 3,323,889. Thus, a bottle is fastened securely in a stationary low set of chucks, while a second bottle is fastened in a set of upper chucks, which are positioned so that the axis of the bottles are at 90° relative to each other. A test load is applied to the upper bottle while it is being driven at a constant speed of 2.8 inches per minute in a direction 45° to the axis of each bottle. The actual rate of scratch propagation on the bottles is then 2 inches per minute.

Using the foregoing test apparatus, a fresh surface of one bottle is always contacted with a fresh surface of the other bottle. Since the base of each bottle extends in the direction of motion, the scratch is propagated from the shoulder portion toward the base. This permits the detection of poor scratch protection in a particular section of the ware, since identical sections of each bottle are contacted.

The force exerted by the second bottle is a known, measured force and, after each pass, the bottles are examined for scratches. The force, or load, in pounds was measured with respect to the scratch-resistance of the dry bottles; of bottles which were wetted with water, i.e., measured while the contacting surfaces in the above test machine were submerged in water; and bottles which had been first subjected to a caustic wash comprising a 5% NaOH aqueous solution at a temperature of 150° F., for a period of one-half hour. The results are set forth below for each of the above examples, and are compared with an uncoated bottle:

TABLE I
Number of Pounds to Produce Scratch

| Example | Dry | Wet | After Caustic Wash Dry | Wet |
|---|---|---|---|---|
| Uncoated bottle | 3 | 5 | 3 | 3 |
| I | 20 | 25 | 10 | 15 |
| II | 100+ | 100+ | 100+ | 100+ |
| III | 10 | 5 | 6 | 6 |
| IV | 100+ | 100+ | 100+ | 100+ |
| V | 55 | 10 | 6 | 6 |
| VI | 100+ | 100+ | 100+ | 100+ |
| VII | 55 | 10 | 20 | 35 |

In Table I, the results of 100+ mean that no scratches had yet developed on the surfaces with the indicated load and no further load was applied.

From the above table, the unexpected and synergistic results obtained by the process of the present invention over the uncoated bottles and the coatings of Examples I, III, V and VII are readily demonstrated. Since almost all food containers are subjected to a plurality of operations including washing, pasteurization, sterilization, caustic baths, and the like, the risk of scratching or abrading the bottles is particularly acute at such times, and it is precisely at such times that the coating of the present invention affords the most protection to the glass surfaces.

EXAMPLE VIII

To further demonstrate the broad principles of the present invention, several bottles were first treated by the process described in Example I and the coated bottles were then further treated by spraying at the rate of 1 g.p.h. with a 0.2% aqueous suspension of polyoxyethylene stearate. The temperature of the bottles was about 200° F. While the 0.2% suspension is preferred, the concentration may be from 0.01 to 1% depending upon the spray rate and time. The temperature is preferably from 150–350° F. The combined thickness of the coatings was less than 1 micron. When two of the bottles were rubbed together by hand, no scratch developed on either bottle.

When these treated bottles were subjected to the above described scratch test, no scratches developed at the 100 pound test load level. This 100+ pound test load value is to be compared to a 20 pound test load value for bottles given a similar polyoxyethylene stearate treatment in the absence of the primary tin treatment.

From the foregoing, various modifications in applying the coatings will be readily apparent to those skilled in the art and such modifications will be considered as coming within the scope of the disclosed invention.

I claim:
1. A method for increasing the abrasion-resistant properties of a glass surface comprising depositing tin oxide on the hot glass surface by applying in the presence of water a tin compound selected from the group consisting of:

$$SnX_4 \text{ and } R_2Sn(OOCR')_2$$

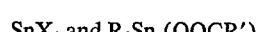

wherein X is a halogen and R and R' are alkyls, while the temperature of said surface is at least as high as the pyrolyzing temperature of said tin compound, cooling said coated surface to a temperature below 350° F. and spraying onto said tin treated glass surface alkylphenoxypoly(ethyleneoxy)ethanol in an amount sufficient to form a thin, transparent coating on said glass surface, and allowing said surface to cool.

2. The method as defined in claim 1 wherein the alkyl of said alkylphenoxypoly(ethyleneoxy) ethanol is selected from the group consisting of octyl and nonyl.

3. The method as defined in claim 2 wherein said alkylphenoxypoly(ethyleneoxy) ethanol has 8 carbon atoms in the alkyl and from 8 to 9 ethyleneoxy groups in the molecule and is applied to said surface by spraying an aqueous medium containing from 0.1 to 1% of the alkylphenoxypoly(ethyleneoxy) ethanol.

4. The method as defined in claim 1 wherein said alkylphenoxypoly(ethyleneoxy) ethanol has from 1 to 100 ethyleneoxy groups per molecule.

5. An article of manufacture having a glass surface which is abrasion resistant and which has a thin, tightly adhering, transparent coating thereon consisting of a tin oxide coating adjacent the surface of the glass and an outer coating which is an alkylphenoxypoly(ethyleneoxy) ethanol superimposed on said tin oxide coating.

References Cited

UNITED STATES PATENTS

| 2,567,331 | 9/1951 | Gaiser et al. | 117—54 X |
| 2,577,936 | 12/1951 | Waggoner | 117—72 |
| 2,667,428 | 1/1954 | Young et al. | 117—54 X |
| 2,813,045 | 11/1957 | Abbott | 117—54 |
| 2,982,672 | 5/1961 | Santelli. | |
| 3,019,135 | 1/1962 | Orr | 117—211 |
| 3,323,889 | 6/1967 | Carl et al. | 117—54 |
| 3,420,693 | 1/1969 | Scholes et al. | 117—72 |

FOREIGN PATENTS 674,619  11/1963  Canada.

WILLIAM D. MARTIN, Primary Examiner
R. HUSACK, Assistant Examiner

U.S. Cl. X.R.

117—54, 88, 94, 104, 119.2, 124